United States Patent
Park

(10) Patent No.: US 7,373,247 B2
(45) Date of Patent: May 13, 2008

(54) METHOD AND APPARATUS FOR UPDATING MAP DATA, AND COMPUTER-READABLE MEDIUM STORING PROGRAM FOR EXECUTING THE METHOD

(75) Inventor: Sung-il Park, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 289 days.

(21) Appl. No.: 11/193,363

(22) Filed: Aug. 1, 2005

(65) Prior Publication Data

US 2006/0106536 A1 May 18, 2006

(30) Foreign Application Priority Data

Nov. 12, 2004 (KR) .................. 10-2004-0092337

(51) Int. Cl.
*G01C 21/30* (2006.01)
(52) U.S. Cl. .............. 701/208; 701/207; 701/209; 701/210; 340/995.1; 340/995.14; 340/905
(58) Field of Classification Search ........ 701/207–210; 340/995.1, 995.14, 905
See application file for complete search history.

(56) References Cited

U.S. PATENT DOCUMENTS

| | | | |
|---|---|---|---|
| 6,236,338 B1 * | 5/2001 | Hamada | 340/995.1 |
| 6,453,233 B1 * | 9/2002 | Kato | 701/208 |
| 6,546,334 B1 * | 4/2003 | Fukuchi et al. | 701/208 |
| 6,646,569 B2 * | 11/2003 | Hamada | 340/995.1 |
| 6,691,128 B2 * | 2/2004 | Natesan et al. | 707/102 |
| 6,704,649 B2 * | 3/2004 | Miyahara | 701/208 |
| 6,766,248 B2 * | 7/2004 | Miyahara | 701/208 |
| 6,784,832 B2 * | 8/2004 | Knockeart et al. | 342/357.13 |
| 6,785,606 B2 | 8/2004 | DeKock et al. | |
| 6,868,334 B2 * | 3/2005 | Nakane et al. | 701/208 |
| 6,876,922 B2 * | 4/2005 | Nagaki | 701/208 |
| 6,937,936 B2 * | 8/2005 | Nimura | 701/208 |
| 6,993,350 B2 * | 1/2006 | Katoh | 455/457 |
| 7,082,443 B1 * | 7/2006 | Ashby | 707/201 |
| 7,146,274 B2 * | 12/2006 | Linkohr | 701/208 |
| 2001/0012782 A1 * | 8/2001 | Hamada | 455/456 |
| 2002/0003495 A1 * | 1/2002 | Johnstone et al. | 342/357.13 |
| 2002/0077745 A1 * | 6/2002 | Ohmura et al. | 701/208 |
| 2003/0028315 A1 * | 2/2003 | Miyahara | 701/208 |
| 2003/0028316 A1 * | 2/2003 | Miyahara | 701/208 |

(Continued)

FOREIGN PATENT DOCUMENTS

CN 1475942 A 2/2004

(Continued)

*Primary Examiner*—Thomas Black
*Assistant Examiner*—Wae Lenny Louie
(74) *Attorney, Agent, or Firm*—Sughrue Mion, PLLC

(57) ABSTRACT

A method and an apparatus for easily updating map data in real time, using a device employing map data or a navigation system, through a transport protocol expert group (TPEG) service, and a computer-readable medium storing a computer program for executing the method, as provided. The method includes determining if the map data has changed using location information received from at least one of a broadcasting network, the Internet, and a transmission medium; and updating the map data based on the location information if the map data has changed.

19 Claims, 10 Drawing Sheets

U.S. PATENT DOCUMENTS

| | | | |
|---|---|---|---|
| 2003/0036845 A1* | 2/2003 | Nakane et al. | 701/208 |
| 2003/0093221 A1* | 5/2003 | Adachi | 701/208 |
| 2003/0144792 A1* | 7/2003 | Amano et al. | 701/207 |
| 2004/0117110 A1* | 6/2004 | Sasajima | 701/208 |
| 2004/0215387 A1* | 10/2004 | Adachi et al. | 701/208 |
| 2005/0015199 A1* | 1/2005 | Lokshin et al. | 701/208 |
| 2005/0049785 A1* | 3/2005 | Vergin | 701/209 |
| 2005/0102099 A1* | 5/2005 | Linn | 701/209 |
| 2005/0114016 A1* | 5/2005 | Kim et al. | 701/208 |
| 2005/0114018 A1* | 5/2005 | Umezu et al. | 701/208 |
| 2006/0105787 A1* | 5/2006 | Seo | 455/456.5 |
| 2006/0173614 A1* | 8/2006 | Nomura | 701/210 |
| 2006/0241858 A1* | 10/2006 | Adachi | 701/207 |
| 2006/0267794 A1* | 11/2006 | Lee et al. | 340/905 |
| 2007/0021907 A1* | 1/2007 | Kato et al. | 701/207 |

FOREIGN PATENT DOCUMENTS

| | | |
|---|---|---|
| JP | 11-258981 A | 9/1999 |
| JP | 2001-227977 A | 8/2001 |
| JP | 2002-228461 A | 8/2002 |
| KR | 2001-0102890 A | 11/2001 |
| KR | 2003-0069770 A | 8/2003 |
| KR | 20-0332049 Y1 | 11/2003 |
| KR | 10-2004-0064346 A | 7/2004 |
| KR | 10-2004-0068767 A | 8/2004 |
| KR | 10-2004-0080884 A | 9/2004 |

* cited by examiner

METHOD AND APPARATUS FOR UPDATING MAP DATA, AND COMPUTER-READABLE MEDIUM STORING PROGRAM FOR EXECUTING THE METHOD

BACKGROUND OF THE INVENTION

This application claims priority from Korean Patent Application No. 10-2004-0092337, filed on Nov. 12, 2004, in the Korean Intellectual Property Office, the disclosure of which is incorporated herein in its entirety by reference.

1. Field of the Invention

Methods and apparatuses consistent with the present invention relate to using map data, and more particularly, to updating map data in a device employing the map data or a navigation system.

2. Description of the Related Art

A device employing map data or a navigation system stores map data when the device or navigation system is manufactured. The device may be a portable phone, a portable device, such as a notebook computer, or a desktop computer. However, map data changes over time. Thus, a device manufacturer or a navigation system manufacturer periodically provides the map data online or offline, or provides the map data online or offline whenever the map data of a specific area changes. A user then updates the map data stored in the device or the navigation system based on the map data provided by the manufacturer.

However, the manufacturer must collect updated map data from a variety of sources, such as from satellite imagery, traffic cameras and correspondents, etc. The manufacturer then processes the collected map data into a format suitable for the device or the navigation system, stores the processed map data in a physical storage medium, such as a compact disk (CD) or a hard disk drive (HDD), and provides the stored map data offline or online, for example, using a wireless Internet connection.

The user updates the map data stored in the device or the navigation system by using the processed map data stored in the physical storage medium, for example, by connecting to a server of the manufacturer via a wireless Internet connection and downloading the processed map data.

Since it is necessary to update the map data stored in the device or the navigation system, the user cannot obtain updated map data in real time and must pay a separate communication fee or a data usage fee in order to download the updated map data.

In the case of an onboard navigation system in an automobile, the user should stop driving the automobile in order to update the map data of the navigation system. Additionally, the user cannot use the device or the navigation system during the updating process. For example, a user cannot update the map data stored in a portable phone while using the portable phone, but instead must wait until after hanging up the phone to update the map data.

SUMMARY OF THE INVENTION

Methods and apparatuses according to exemplary embodiments of the present invention easily update map data in real time, in a device employing the map data or a navigation system, using a transport protocol expert group (TPEG) service. A computer-readable medium may store a computer program for executing such a method.

According to an aspect of the present invention, there is provided a method of updating map data, the method comprising determining if the map data has changed using location information received from at least one of a broadcasting network, the Internet, and a transmission medium; and updating the map data based on the location information if the map data has changed.

The location information may be included in a TPEG message.

The determining if the map data has changed may comprise converting the location information into the same format as the map data stored in a user device; and determining if the map data stored in the user device has changed using the location information.

The determining if the map data has changed may further comprise using a transport protocol expert group road traffic message (TPEG-RTM) included in the TPEG message.

The updating the map data may comprise indicating a change in the map data on a displayed map.

The updating the map data may comprise checking an operation mode type; if the operation mode type is a first type (i.e., an option 1), displaying the map including changes based on the location information; if the operation mode type is a second type (i.e., an option 2), confirming if the user wants to update the map data stored in a user device, and updating the map data stored in the user device if it is confirmed that the user wants to update the map data; and if the operation mode is a third type (i.e., an option 3), automatically updating the map data stored in the user device.

The updating the map data may further comprise, if the user requests to update the map data of a specific area, requesting location information of the specific area using a bi-directional channel.

The transmission medium may be able to transmit additional data, as well as the map data.

According to another aspect of the present invention, there is provided an apparatus for updating map data, the apparatus comprising a decoder which receives location information from at least one of a broadcasting network, the Internet, and a transmission medium, and decodes the received location information; a storage unit which stores the map data; and a controller which determines if the map data stored in the storage unit has changed based on the decoded location information, and updates the stored map data when it is determined that the map data has changed.

The apparatus may further comprise a transmitter which sends a location information request signal relating to a specific area, wherein the controller controls the transmitter if the user requests to update the map data of the specific area.

According to still another aspect of the present invention, there is provided a computer-readable storage medium having embodied thereon a computer program for executing a method of updating map data, the method comprising: determining if the map data has changed using location information received from at least one of a broadcasting network, the Internet, and a transmission medium; and updating the map data based on the location information if the map data has changed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

The present invention will now be described more fully with reference to the accompanying drawings.

Figure 1:
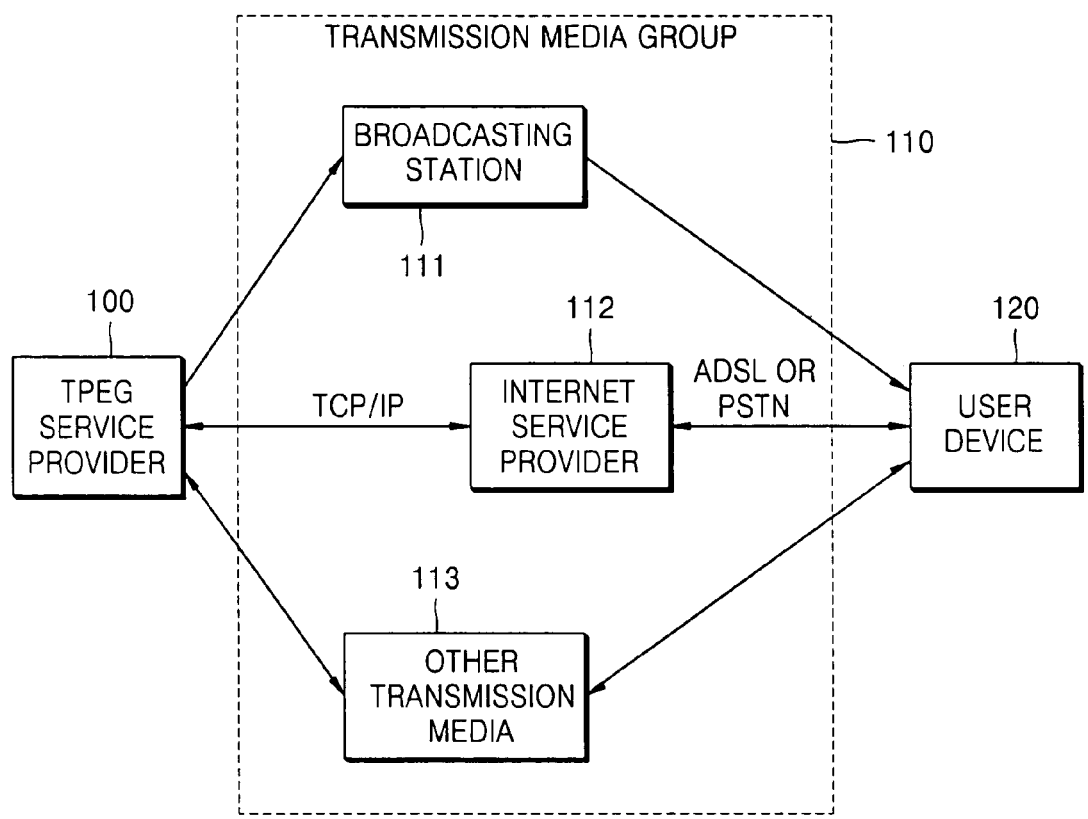
FIG. 1 is a schematic diagram of a system including a user device capable of updating map data according to an exemplary embodiment of the present invention.

FIG. 1 is a schematic diagram of a system including a user device capable of updating map data according to an exemplary embodiment of the present invention. Referring to FIG. 1, the system comprises a TPEG service provider 100, a transmission media group 110, and a user device 120.

The TPEG service provider 100 obtains traffic information and/or travel information using a variety of sources, such as satellite imagery, traffic correspondents, traffic cameras, etc., and constructs a TPEG message database. The TPEG message database is updated whenever the TPEG service provider 100 obtains new traffic and/or travel information.

The TPEG service provider 100 generates a TPEG stream that encodes traffic information and/or travel information included in the TPEG message database in a manner suitable for a TPEG specification. The TPEG service provider 100 provides the TPEG stream through a transparent data channel (TDC) using a broadcasting network such as a digital audio broadcasting (DAB) network or a digital multimedia broadcasting (DMB) network. The TDC, which is specified in the DAB, is used to transmit data in a format defined by a broadcaster or a stream provider.

The TPEG specification is used to provide traffic information and travel information in a multimedia broadcasting environment based on a TPEG technology developed by the Broadcasting Management Committee of the European Broadcasting Union (EBU).

The TPEG specification is not limited to the broadcasting network, and uses various transmission media for transmitting additional data. TPEG data is transmitted according to a method of transmitting data in a transmission medium. For example, if the TPEG service provider 100 provides the TPEG stream using the DAB network, a method in which the DAB transmits additional data is used to transmit the TPEG stream. If the TPEG service provider 100 provides the TPEG stream using a TCP/IP network, an IP datagram is used to transmit the TPEG stream. Therefore, the TPEG service provider 100 can generate the TPEG stream in a format suitable for each transmission medium.

The transmission media group 110 comprises a broadcasting network linked to a broadcasting station 111, the Internet accessible via an Internet service provider 112 that is connected to the TPEG service provider 100 using transmission control protocol/Internet protocol (TCP/IP), and the user device 120 using an asymmetric digital subscriber line (ADSL) or a packet switched data network (PSDN) technology, and other transmission media 113.

The broadcasting station 111 receives the TPEG stream using the TDC, adds the TPEG stream to broadcasting data as additional data, and sends the combined broadcasting data to the user device 120. The broadcasting station 111 can add the TPEG stream to broadcasting data of a specific channel. Broadcasting data sent by the broadcasting station 111 may be in the form of a digital or an analogue broadcasting signal. The broadcasting station 111 transmits data using a broadcasting network.

The Internet service provider 112 receives the TPEG stream in the TCP/IP format, and transmits the TPEG stream to the user device 120 using the ADSL or PSDN.

The other transmission media 113, which are various transmission media for transmitting additional data, provide a signal including the TPEG stream received by the TPEG service provider 100 to the user device 120.

The user device 120 is used to store map data and update the map data using a TPEG service. The user device 120 can process traffic information and travel information based on the TPEG service. The user device 120 receives the TPEG stream, decodes the TPEG stream, and provides a user with traffic and travel information. The user device 120 receives the TPEG stream via a DAB network or a DMB network. The user device 120 can receive the TPEG stream wrapped up in the TDC, detect the TPEG stream from the TDC, and decode the TPEG stream.

The user device 120 receives a signal including the TPEG stream sent by one of the transmission media group 100. The user device 120 may be, for example, a navigation device embedded in a mobile system such as a vehicle, a portable device such as a portable phone or a notebook computer, a computer system such as a desktop computer, or a broadcasting receiver such as a digital television or a digital audio device.

The TPEG service provider 100 of FIG. 1 may be the broadcasting station 111. If the broadcasting station 111 is the TPEG service provider 100, the broadcasting station 111 generates the TPEG stream using traffic and travel information, and sends the TPEG stream as additional data of broadcasting data. The broadcasting station 111 sends broadcasting data to the user device 120 directly or via the Internet service provider 112 or the other transmission media 113.

Figure 2:
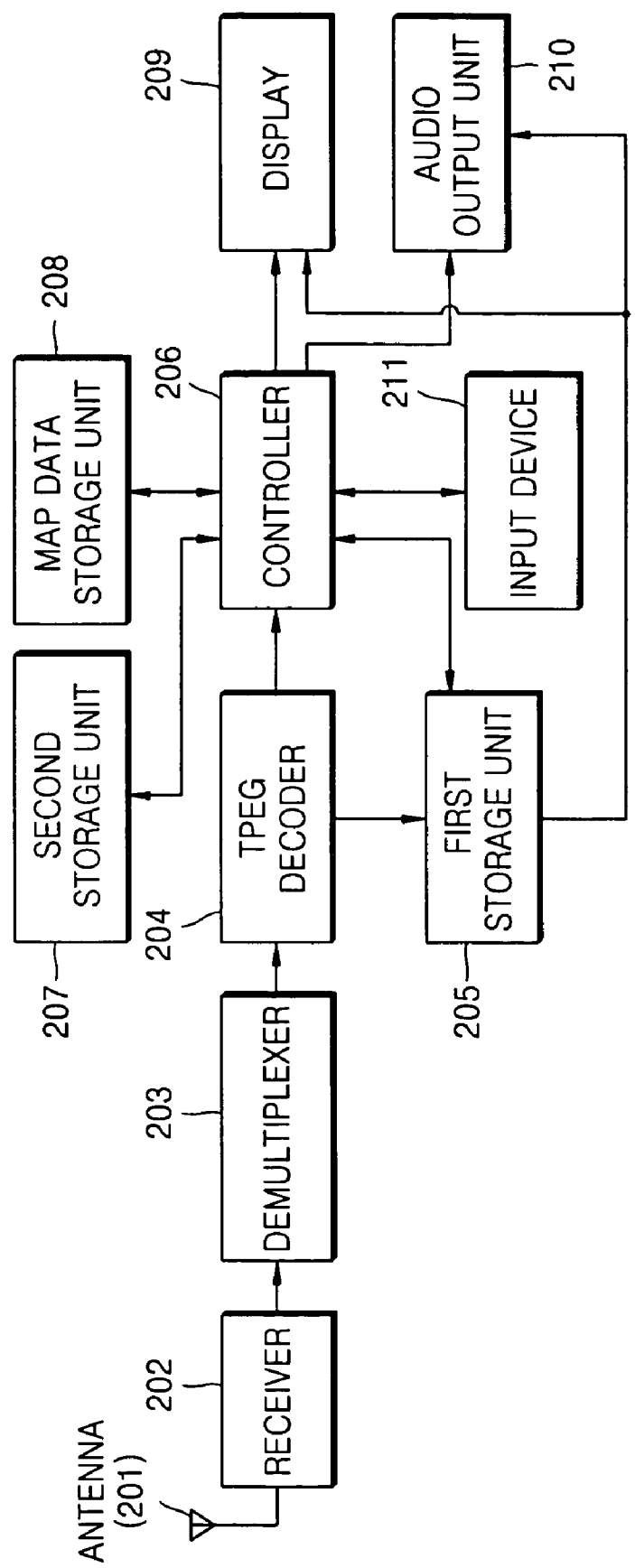
FIG. 2 is a block diagram of the user device comprising an apparatus for updating map data according to an exemplary embodiment of the present invention.

The user device 120 can be configured as shown in FIG. 2. FIG. 2 is a block diagram of the user device 120 comprising an apparatus for updating map data according to an exemplary embodiment of the present invention. The user device 120 can receive a digital broadcasting signal or an RF signal sent by the broadcasting station 111.

Referring to FIG. 2, the user device 120 comprises an antenna 201, a receiver 202, a demultiplexer 203, a TPEG decoder 204, a first storage unit 205, a controller 206, a second storage unit 207, a map data storage unit 208, a display 209, an audio output unit 210, and an input device 211.

The antenna 201 and the receiver 202 receive the digital broadcasting signal or the analogue broadcasting signal sent by the broadcasting station 111 included in the transmission media group 110 of FIG. 1. The digital broadcasting signal or the analogue broadcasting signal includes TDC data that encodes the TPEG stream.

However, when the user device 120 receives a signal sent by the Internet service provider 112 using the ADSL or the PSDN, a modem is substituted for the antenna 201 and the receiver 202. When the user device 120 receives a signal sent by the other transmission media 113, a receiver for that signal is substituted for the antenna 201 and the receiver 202.

When the user device 120 selectively receives a signal sent by transmission media included in the transmission media group 110, a plurality of receivers are substituted for the antenna 201 and the receiver 202. The plurality of receivers receive a signal sent by a corresponding transmission medium included in the transmission media group 110 and are selectively enabled.

The demultiplexer 203 demultiplexes a signal transmitted from the receiver 202 and transmits the demultiplexed signal to a corresponding decoder. That is, the demultiplexer 203 demultiplexes the TPEG stream and transmits the demultiplexed TPEG stream to the TPEG decoder 204. The demultiplexer 203 demultiplexes an image signal and transmits the demultiplexed image signal to an image signal decoder (not shown). The demultiplexer 203 demultiplexes an audio signal and transmits the demultiplexed audio signal to an audio signal decoder (not shown).

The TPEG decoder 204 decodes the TPEG stream, obtains a TPEG message, and transmits the TPEG message to the first storage unit 205 and the controller 206.

Figure 3:
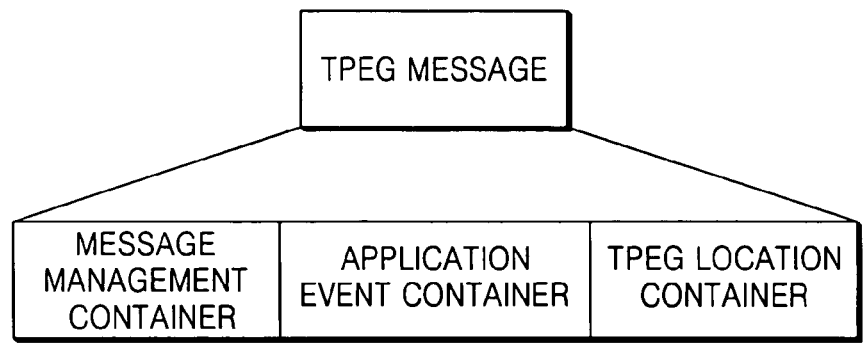
FIG. 3 is a diagram of a TPEG message format.

FIG. 3 is a diagram of a TPEG message format. Referring to FIG. 3, the TPEG message comprises a message management container field, an application event container field, and a TPEG location container field.

The message management container field includes management information relating to the TPEG message, such as a message identifier, version, etc.

The application event container field includes messages corresponding to traffic information. The application event container field changes according to whether an event is a TPEG road traffic message (TPEG-RTM) or TPEG public transport information (TPEG-PTI). The TPEG-RTM and TPEG-PTI include traffic and travel information, which includes route information including a present location, a destination, a route to the destination, and other information on such things as restaurants and entertainment along the route and at the destination.

Figure 4:
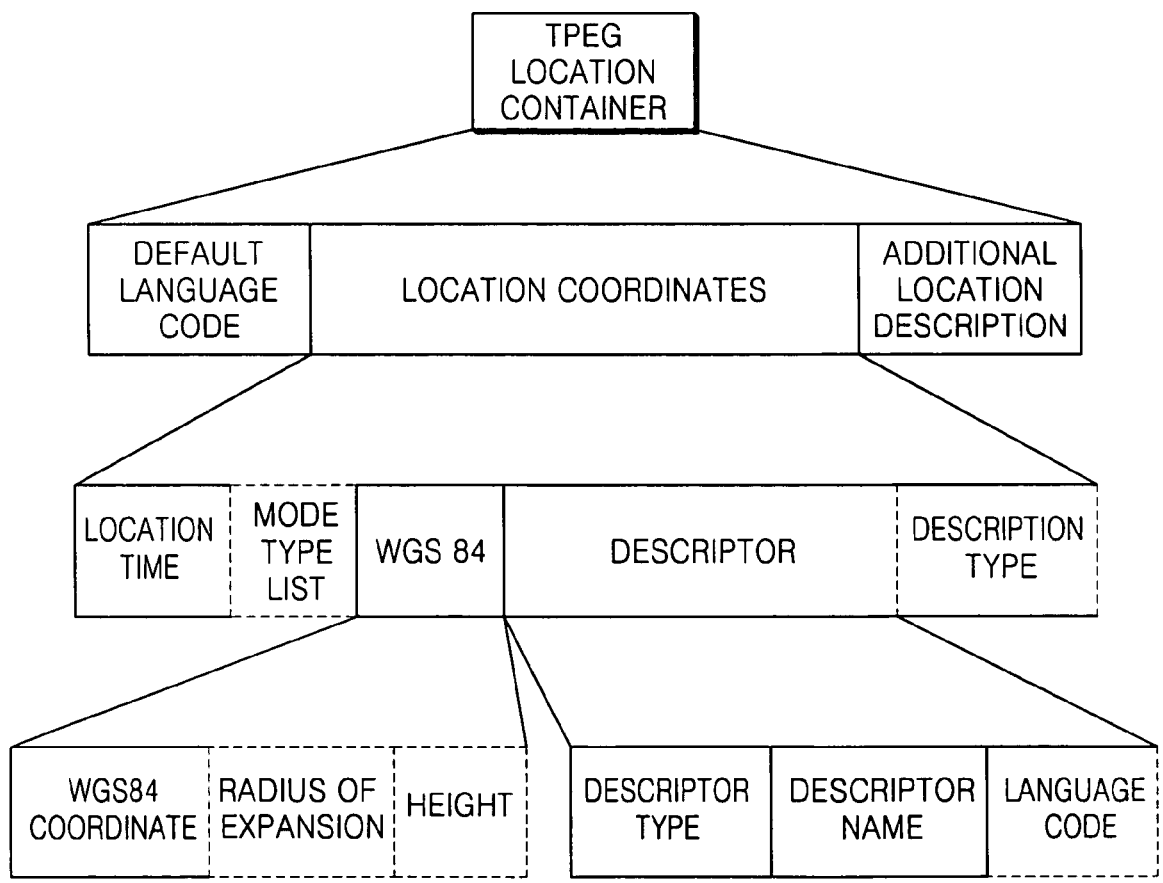
FIG. 4 is a diagram of a TPEG location container field format.

FIG. 4 is a diagram of a TPEG location container field format. Referring to FIG. 4, the TPEG location container field including location information comprises a default language code field, a location coordinates field, and an additional location description field.

It is possible to determine the location of a specific object based on information stored in the location coordinates field. In particular, since a World Geodetic System 1984 (WGS84) coordinate defined in a WGS84 field is unique identification information referring to a single specific plane on the Earth, it is possible to determine the location of the specific object based on the WGS84 coordinate information. Additionally, it is possible to determine a road width based on a radius of expansion defined in the WGS84 field. Since the location coordinates field includes a descriptor mode type list that indicates a type of the specific object, it is possible to determine the type of the object, such as an airport or a bus station, at the specific location.

The TPEG message is stored in the first storage unit 205 and controlled by the controller 206 in order to provide the user with traffic information and/or travel information using the display 209 and/or the audio output unit 210.

The controller 206 can update map data according to the present exemplary embodiment. The controller 206 receives the TPEG message from the TPEG decoder 204, and checks whether the TPEG message includes the TPEG-RTM. If the TPEG message includes the TPEG-RTM, the controller 206 checks whether the TPEG-RTM field includes road information. If the TPEG-RTM field includes road information, the controller 206 stores the road information in the second storage unit 207.

The controller 206 checks whether the TPEG message includes a TPEG-LOC message or the TPEG location container field. If the TPEG message includes the TPEG-LOC message, the controller 206 checks whether the TPEG-LOC message includes the WGS84 field. If the TPEG-LOC message includes the WGS84 field, the controller 206 detects the WGS84 coordinate information defined in the WGS84 field.

The controller 206 converts the detected WGS84 coordinate information into the same format as the map data stored in the map data storage unit 208. The controller 206 checks whether the map data stored in the map data storage unit 208 has changed based on the converted WGS84 coordinate, the TPEG-RTM stored in the second storage unit 207, and information stored in a description field of the TPEG-LOC.

For example, the controller 206 searches a location corresponding to the converted WGS84 coordinate information among the map data stored in the map data storage unit 208, and checks whether the object is at the searched location, or whether road width information corresponds to the searched location, based on the TPEG-RTM and/or the TPEG-LOC message of the TPEG message. If the object is not at the searched location, or road width information does not correspond to the searched location, the controller 206 determines that map data of the location (area) corresponding to the converted WGS84 coordinate has changed.

If the map data has changed, the controller 206 checks an operation mode type with respect to a map data update. If the operation mode type is an option 1, the controller 206 does not update the map data stored in the map data storage unit 208 based on the TPEG message but indicates changes on a map corresponding to the map data by displaying the map on the display 209.

Figure 5:
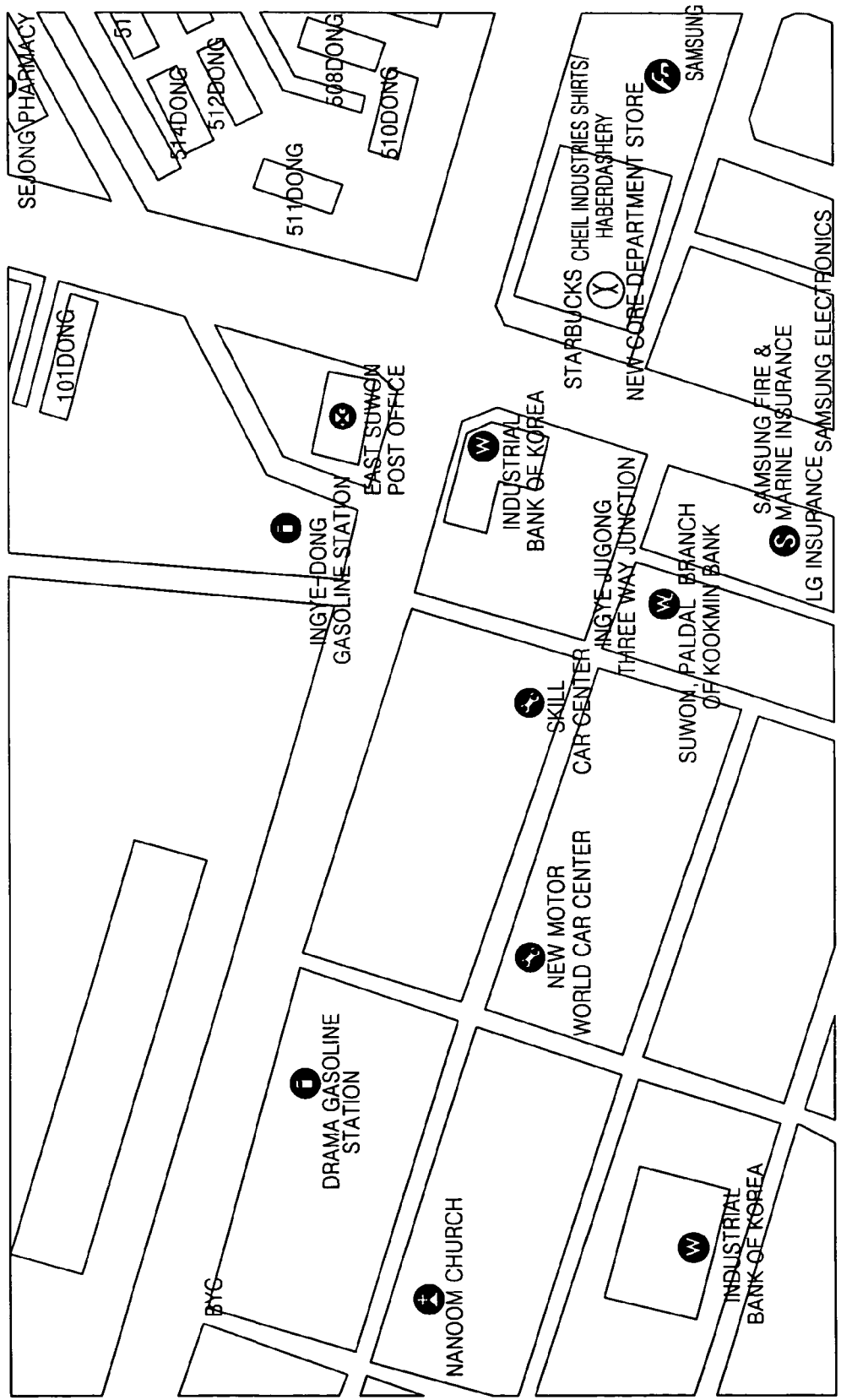
FIG. 5 is a map based on map data stored in a user device according to an exemplary embodiment of the present invention.

FIG. 5 is a map based on the map data stored in the user device 120. The controller 206 displays the map on the display 209, based on the map data stored in the map data storage unit 208, as shown in FIG. 5.

Figure 6:
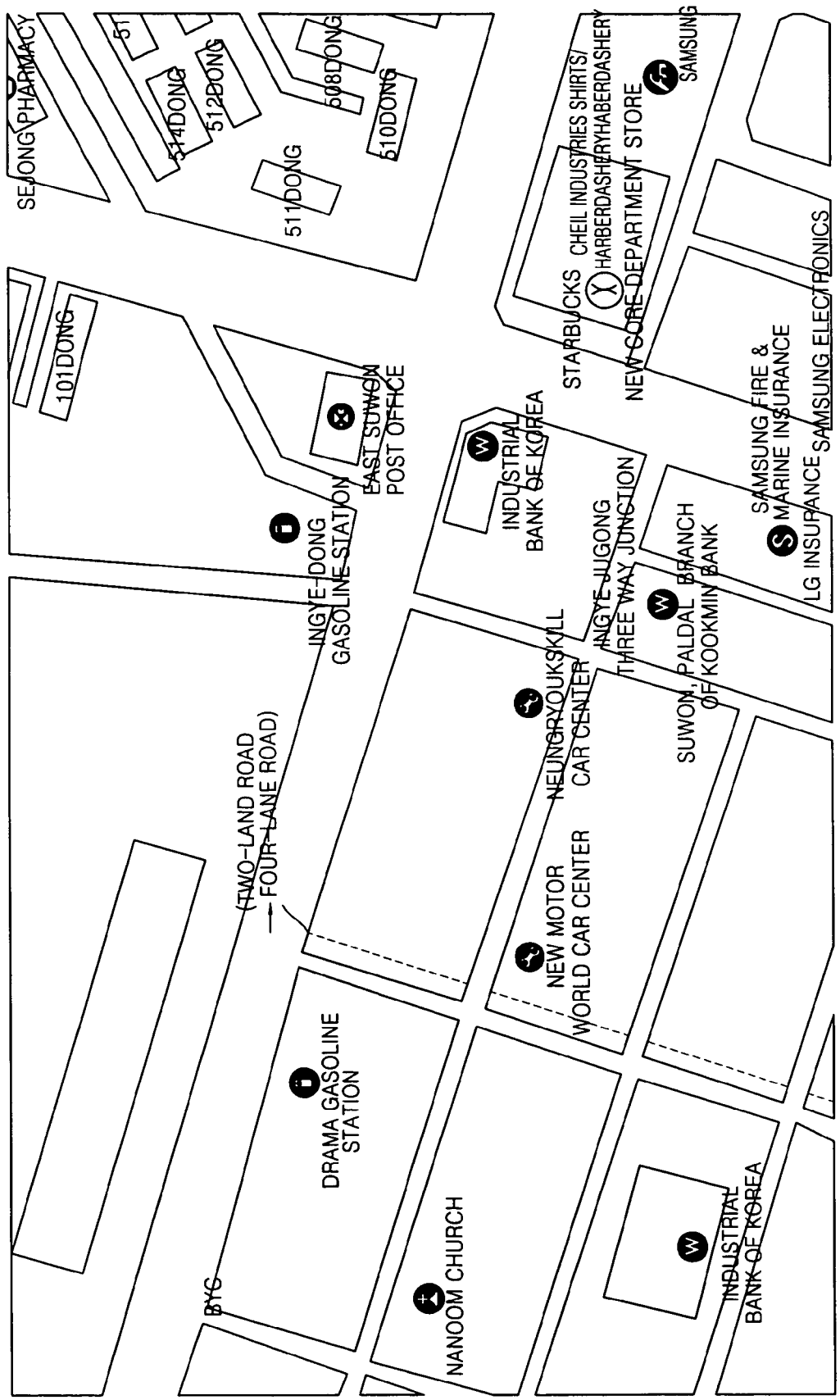
FIG. 6 is a map indicating changes based on a TPEG message according to an exemplary embodiment of the present invention.

FIG. 6 is a map including changes from the map of FIG. 5, based on the TPEG message. When a two-lane road between Drama Gasoline Station and New Motor World Car Center is changed into a four-lane road, as determined based on the TPEG message, if the operation mode type is the option 1, the controller 206 indicates changes on the map displayed on the display 209, as shown in FIG. 6.

However, if the operation mode type is an option 2, the controller 206 outputs a message to the display 209 or the audio output unit 210 to confirm whether the user wants to update the map data stored in the map data storage unit 208. If the user wants to update the map data, the controller 206 updates the map data of the relevant area among the map data stored in the map data storage unit 208, based on the TPEG message. If the user does not want to update the map data, the controller 206 operates in the same manner as when the operation mode type is the option 1.

Figure 7:
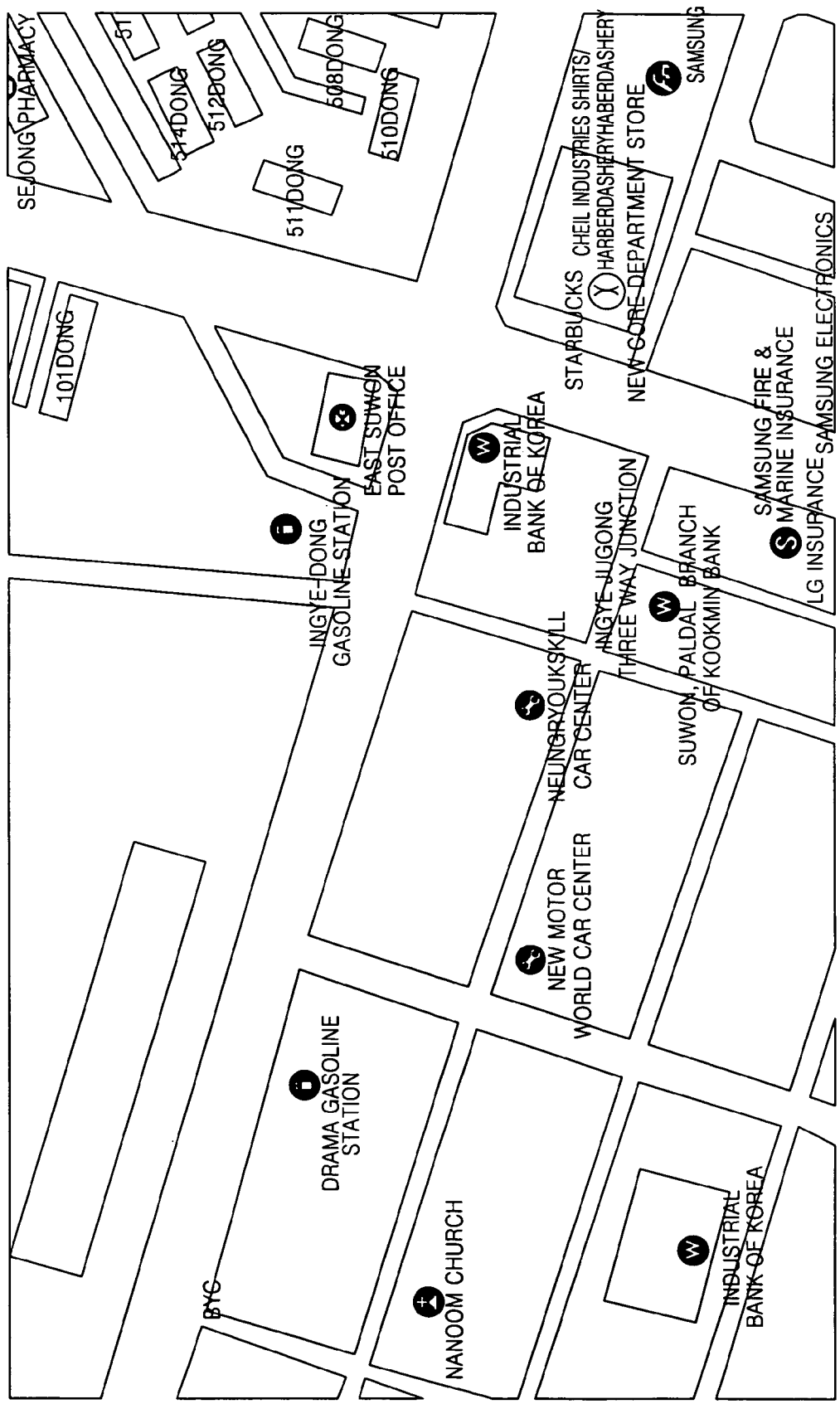
FIG. 7 is a map that has been updated based on the changes of FIG. 6.

FIG. 7 is a map that has been updated based on the changes shown in FIG. 6. If the operation mode type is an option 3, the controller 206 updates the map data stored in the map data storage unit 208 based on the TPEG message, as shown in FIG. 7.

The second storage unit 207 stores the TPEG-RTM included in the TPEG message, under control of the controller 206.

The map data storage unit 208 stores map data of a whole area or a part of the whole area. The controller 206 updates the map data of the area corresponding to the TPEG message among the map data stored in the map data storage unit 208.

The display 209 displays a map of a specific area, as shown in FIGS. 5 to 7. The specific area includes the updated map data or traffic and/or travel information based on the TPEG message. If the user device 120 is a television broadcasting receiver, the display 209 displays a received image signal.

The audio output unit 210 outputs an audio signal in order to confirm whether the user wants to update the map data stored in the map data storage unit 208. The audio output unit 210 can output the audio signal relating to traffic and/or travel information based on the TPEG message. If the user device 120 is the television broadcasting receiver, the audio output unit 210 outputs a received audio signal.

The input device 211 inputs option mode setting information and update request information for updating the map data described above.

Figure 8:
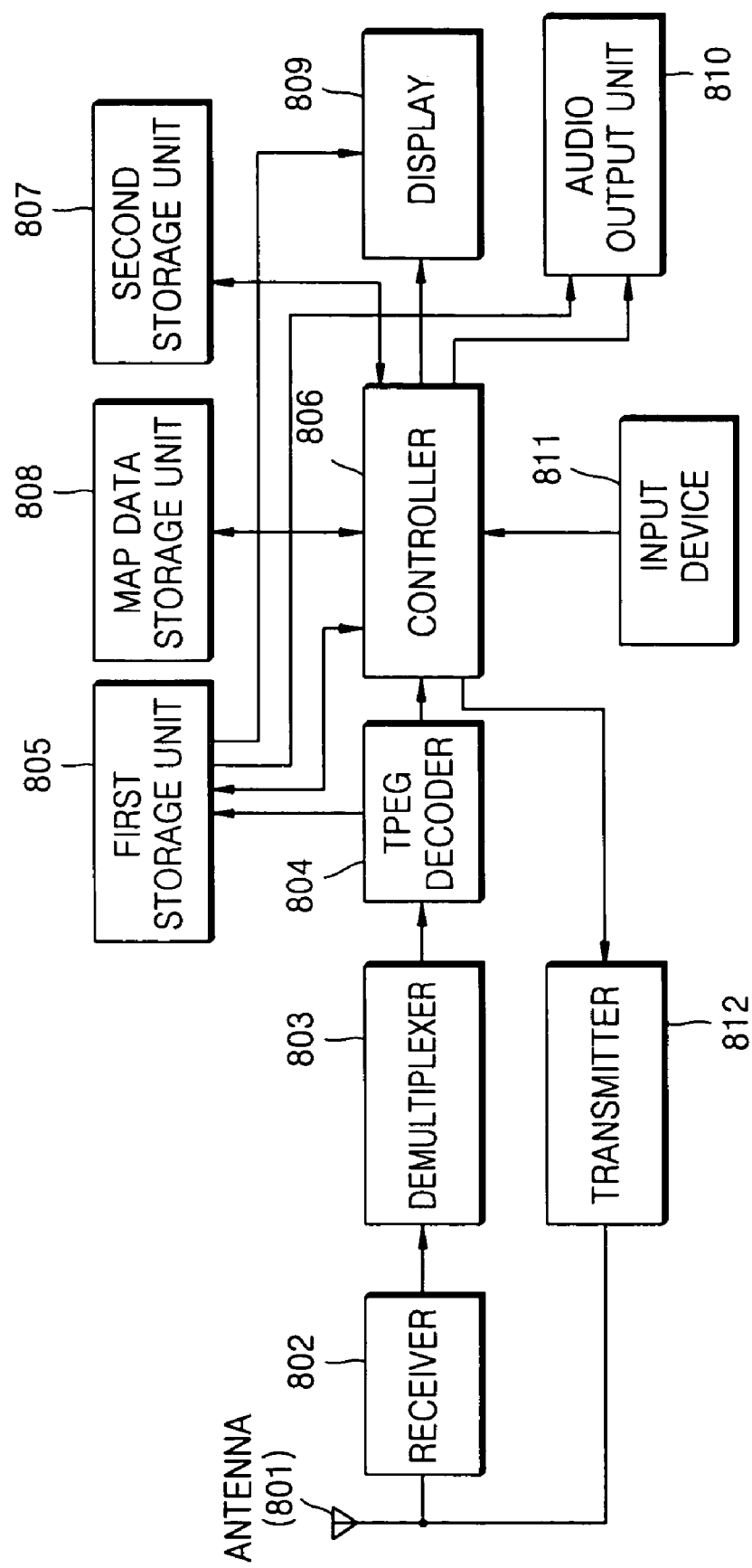
FIG. 8 is a block diagram of a user device comprising an apparatus for updating map data according to another exemplary embodiment of the present invention.

FIG. 8 is a block diagram of the user device 120 comprising an apparatus for updating map data according to another exemplary embodiment of the present invention. Referring to FIG. 8, the user device 120 comprises an antenna 801, a receiver 802, a demultiplexer 803, a TPEG decoder 804, a first storage unit 805, a controller 806, a second storage unit 807, a map data storage unit 808, a display 809, an audio output unit 810, an input device 811, and a transmitter 812.

If the user requests to update map data of a specific area using the input device 811, the controller 806 controls the transmitter 812 so that the transmitter 812 and the antenna 801 send a location information (or TPEG stream) request message for the specific area to the TPEG service provider 100. The transmitter 812 and antenna 801 transmit the TPEG stream request message through a bi-directional channel of the user device 120. The user device 120 receives the TPEG stream from the TPEG service provider 100, decodes the received TPEG stream, and updates the map data using the decoded TPEG message, as described above with reference to FIG. 2.

Therefore, the antenna 801, the receiver 802, the demultiplexer 803, the TPEG decoder 804, the first storage unit 805, the controller 806, the second storage unit 807, the map data storage unit 808, the display 809, and the audio output unit 810 shown in FIG. 8 operate in the same manner as their counterparts shown in FIG. 2.

Figure 9:
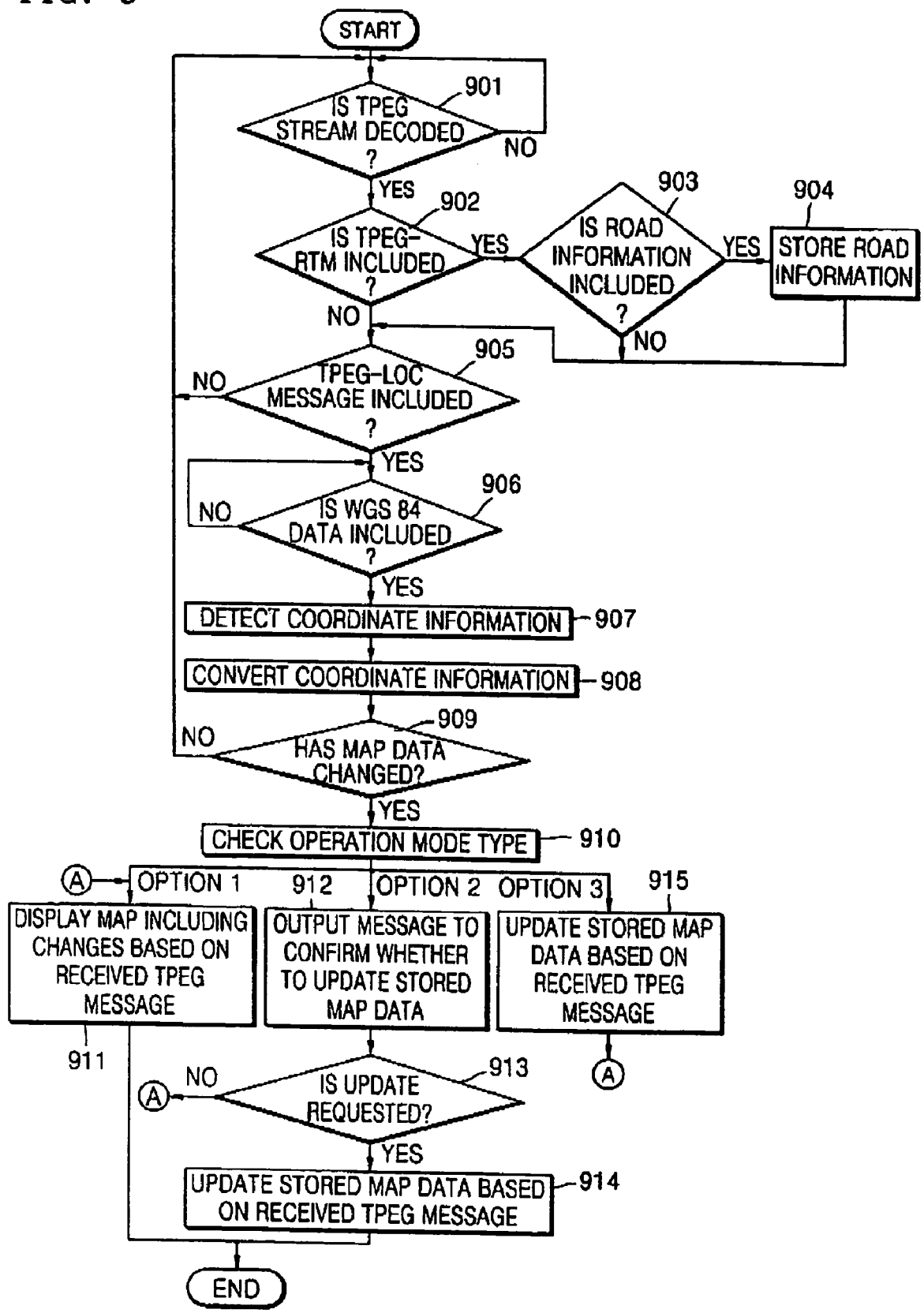
FIG. 9 is a flowchart of a method of updating map data according to another exemplary embodiment of the present invention.

FIG. 9 is a flowchart of a method of updating map data according to another exemplary embodiment of the present invention. FIG. 9 shows that the user device 120 receives a TPEG stream from at least one of the transmission media group 110, and updates the map data stored in the user device 120 based on the received TPEG stream.

The user device 120 decodes the received TPEG stream and obtains the TPEG message in Operation 901. The user device 120 checks whether the TPEG message includes the TPEG-RTM in Operation 902. If the TPEG message includes the TPEG-RTM, the user device 120 checks whether the TPEG-RTM includes road information in Operation 903. If the TPEG-RTM includes road information, the user device 120 stores the road information in Operation 904.

If the decoded TPEG message does not include the TPEG-RTM or road information or the road information is stored in the user device 120, the user device 120 checks whether the decoded TPEG message includes the TPEG-LOC message in Operation 905. If the decoded TPEG message does not include the TPEG-LOC message, the user device 120 returns to Operation 901.

If the decoded TPEG message includes the TPEG-LOC message, the user device 120 checks whether the TPEG-LOC message includes the WGS84 data field in Operation 906. If the TPEG-LOC message includes the WGS84 data field, the user device 120 detects WGS84 coordinate information from the WGS84 data field in Operation 907.

The user device 120 converts the WGS84 coordinate information into the same format as the map data stored in the user device 120 in Operation 908. The user device 120 checks whether the map data stored in the user device 120 has changed based on the converted WGS84 coordinate information, and the TPEG-RTM and road information, if included, in Operation 909.

The user device 120 searches an area among the map data stored in the user device 120 based on the converted WGS84 coordinate information, and checks if the searched area has changed using the TPEG-RTM and the road information, if available. The user device 120 may determine if the map data stored in the user device 120 has changed using information included in the descriptor field of the TPEG-LOC message.

If it is determined in Operation 909 that the map data stored in the user device 120 has not changed, the user device 120 returns to Operation 901. If it is determined in Operation 909 that the map data stored in the user device 120 has changed, the user device 120 checks the operation mode type in Operation 910.

If the operation mode type is the option 1, the user device 120 displays a map including changes based on the TPEG message, as shown in FIG. 6, in Operation 911. The map data stored in the user device 120, however, is not updated.

If the operation mode type is the option 2, the user device 120 outputs a message to confirm if the user wants to update the map data stored in the user device 120, in Operation 912. If the user inputs a command to update the map data in Operation 913, the user device 120 updates the map data based on the TPEG message, in Operation 914. If the user does not input a command to update the map data, the user device 120 does not update the map data, and returns to Operation 911.

If the operation mode type is the option 3, the user device 120 automatically updates the map data stored in the user device 120, based on the TPEG message, and returns to Operation 911. Alternatively, the user device 120 may automatically update the map data based on the TPEG message and ends the map data update without returning to Operation 911.

Figure 10A:
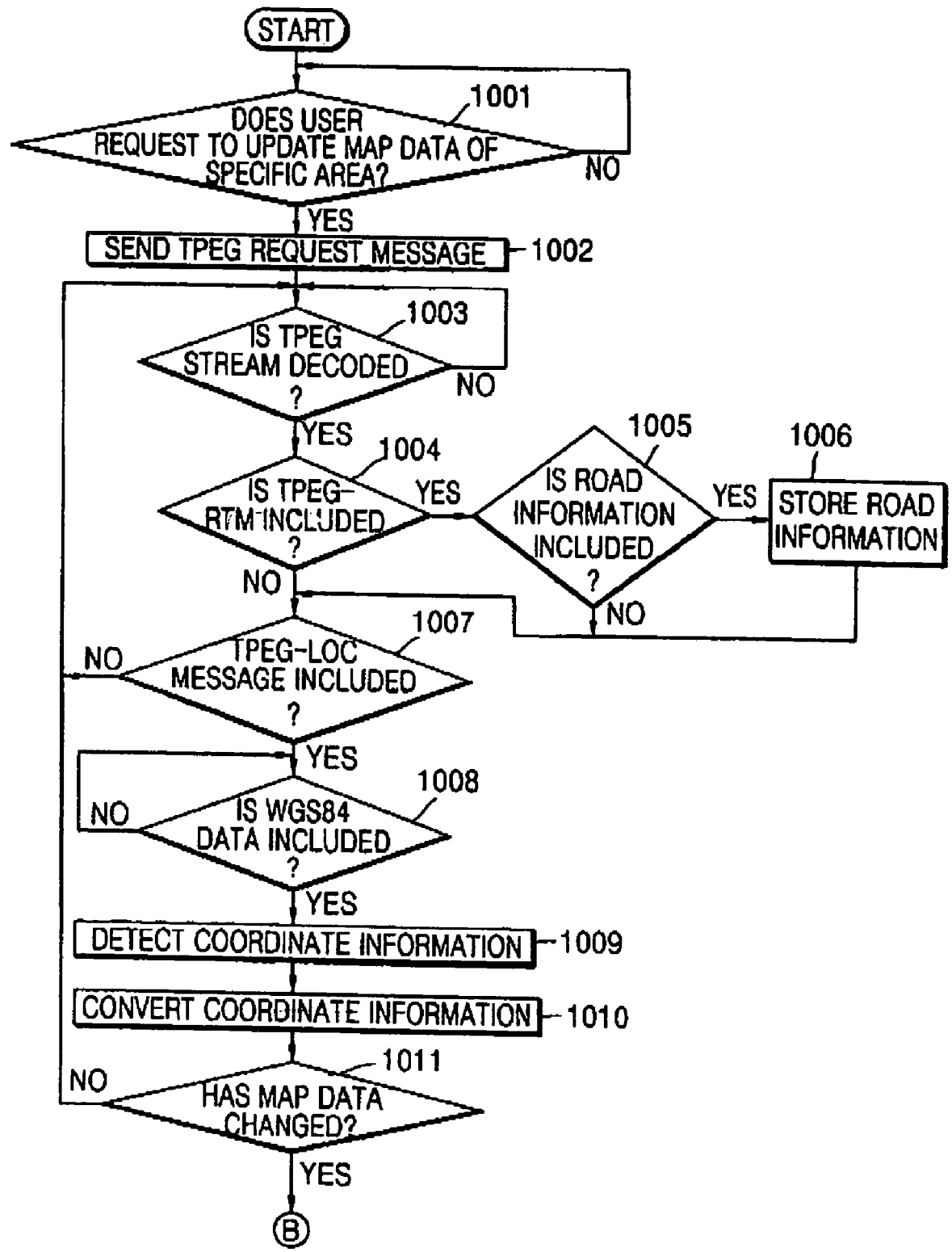
FIGS. 10A and 10B are flowcharts of a method of updating map data according to yet another exemplary embodiment of the present invention.
Figure 10B:
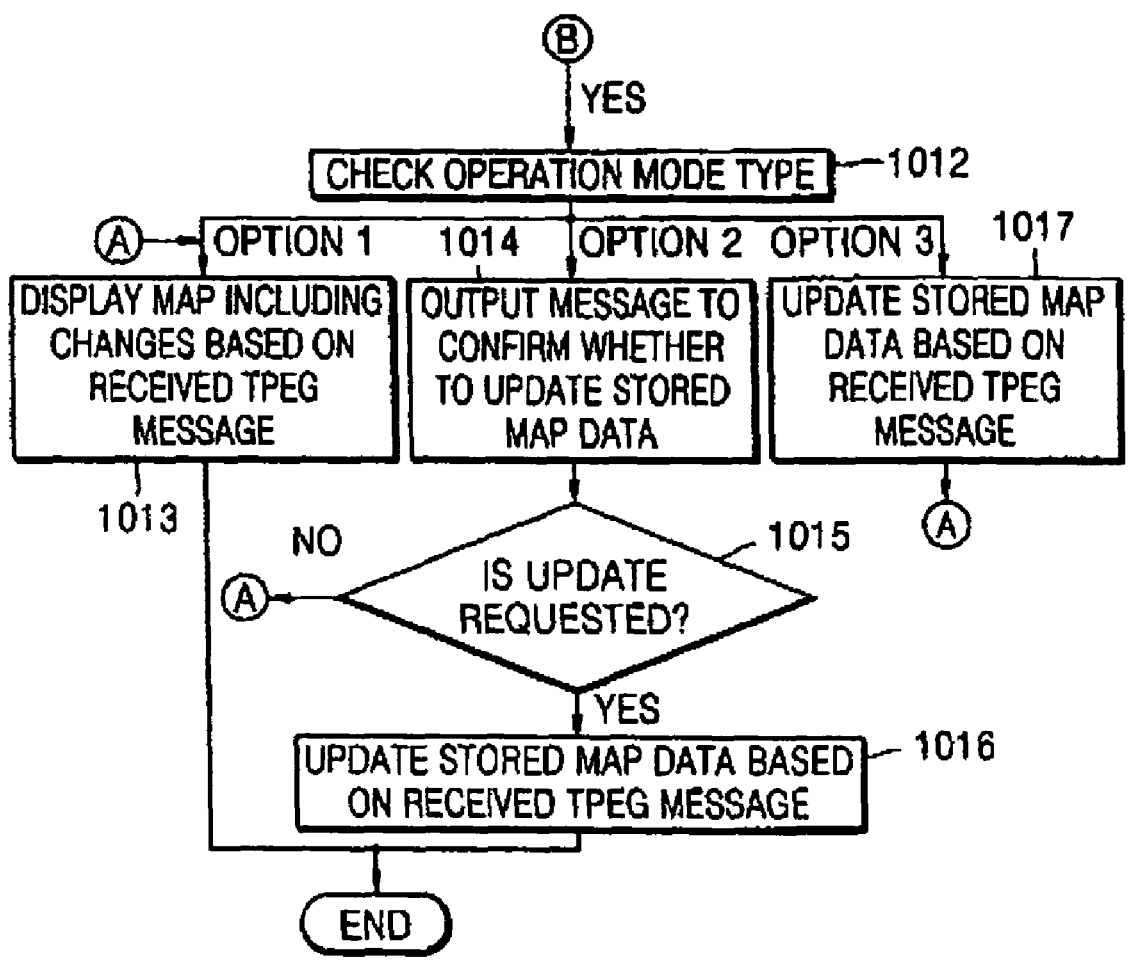

FIGS. 10A and 10B are flow charts of a method of updating map data according to another exemplary embodiment of the present invention. If the user requests updating of the map data for a specific area, the user device 120 receives the TPEG message for the specific area, and updates the map data of the specific area.

If the user requests updating of the map data for the specific area in Operation 1001, the user device 120 sends the TPEG request message for the specific area to the TPEG service provider 100 in Operation 1002. A bi-directional channel of the user device 120 is used to send the TPEG request message.

The user device 120 receives a TPEG stream in response to the TPEG request message, decodes the TPEG stream, and obtains a TPEG message of the specific area, in Operation 1003. The user device 120 updates the map data through Operations 1004 to 1017, which correspond to Operations 902 to 915 of FIG. 9.

According to the exemplary embodiments of the present invention, map data stored in a user device using the map data or a navigation system is automatically updated in real time without having to pay any separate fees, such as a packet fee or a data usage fee.

Also, according to the exemplary embodiments of the present invention, map data stored in a user device is easily updated using an existing broadcasting channel, without effort by a user, and updated map data is provided in real time whenever the map data changes, thereby maintaining up-to-date maps.

It is possible for exemplary embodiments of the present invention to be realized in the form of computer code stored on a computer-readable recording medium. Here, the computer-readable recording medium can be any kind of recording device that stores computer system-readable data, such as ROM, RAM, CD-ROM, magnetic tape, floppy discs, optical data storage devices, etc., or carrier waves (e.g., a transmission over the Internet). Also the computer-readable recording medium may be distributed among computer systems connected via a network, so that the code corresponding to the present invention can be stored and executed in a decentralized manner.

While the present invention has been particularly shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method of updating map data, the method comprising:
   receiving first location information and first map data from at least one of a broadcasting network, the Internet, and a transmission medium;
   determining if second map data stored in a device has changed by checking whether the first location information corresponds to second location information searched from the second map; and
   updating the second map data based on the first map data or displaying the first map data, if the second map data has changed.

2. The method of claim 1, wherein the first location information is included in a transport protocol expert group (TPEG) message.

3. The method of claim 2, wherein the determining if the second map data has changed comprises:
   converting the first location information into the same format as the second map data;
   checking whether the converted first location information corresponds to second location information; and
   determining that the second map data has changed if the converted first location information does not correspond to the second location information.

4. The method of claim 3, wherein the determining if the second map data has changed further comprises using a transport protocol expert group road traffic message (TPEG-RTM) included in the TPEG message.

5. The method of claim 2, wherein the determining if the second map data has changed further comprises using a transport protocol expert group road traffic message (TPEG-RTM) included in the TPEG message.

6. The method of claim 2, wherein the updating the second map data comprises indicating changes to the second map data on a displayed map.

7. The method of claim 2, wherein the updating the second map data comprises:
   determining if a user wants to update the second map data; and
   updating the second map data if it is determined that the user wants to update the second map data.

8. The method of claim 2, wherein the updating the map data comprises:
   determining an operation mode type;
   if the operation mode type is a first type, displaying the first map data;
   if the operation mode type is a second type, determining if a user wants to update the second map data, and updating the second map data if it is determining that the user wants to update the second map data; and
   if the operation mode type is a third type, automatically updating the second map data.

9. The method of claim 2, wherein the updating the second map data comprises, if a user requests to update the second map data of a specific area, sending location information request signal of the specific area to at least one of a broadcasting network, the Internet, and a transmission medium.

10. The method of claim 2, wherein the transmission medium is able to transmit additional data.

11. An apparatus for updating map data, the apparatus comprising:
    a decoder which receives first location information from at least one of a broadcasting network, the Internet, and a transmission medium, and decodes the first location information;
    a storage unit which stores second map data; and
    a controller which determines if the second map data has changed by checking whether the first location information corresponds to second location information searched from the second map data, determines that the second map data has changed if the first location information does not corresponded to the second location information, and updates the second map data based on first map data received from at least one of the broadcasting network, the Internet, and the transmission medium, wherein the first map data is received with the first location information.

12. The apparatus of claim 11, wherein the first location information is included in a transport protocol expert group (TPEG) message.

13. The apparatus of claim 12, wherein the controller determines if the second map data has changed further using a transport protocol expert group road traffic message (TPEG-RTM) included in the TPEG message.

14. The apparatus of claim 13, wherein the controller performs the operations of:
    converting the first location information into the same format as the second map data; and
    determining if the map data has changed by checking whether the converted first location information corresponds to second location information searched from the second map data.

15. The apparatus of claim 12, wherein the controller performs the operations of:

converting the first location information into the same format as the second map data; and determining if the map data has changed by checking whether the converted first location information corresponds to second location information searched from the second map data.

16. The apparatus of claim 12, further comprising:

a display unit which displaying a map based on the second map data, wherein the controller performs the operations of:

determining an operation mode type if it is determined that the second map data has changed;

if the operation mode type is a first type, displaying the first map on the display unit;

if the operation mode type is a second type, determining if a user wants to update the second map data, and updating the second map data if it is determined that the user wants to update the second map data; and if the operation mode type is a third type, automatically updating the second map data.

17. The apparatus of claim 12, further comprising a transmitter which sends a location information request signal, relating to a specific area, to at least one of the broadcasting network, the Internet, and the transmission medium, wherein the controller controls the transmitter if the user requests to update the second map data of the specific area.

18. The apparatus of claim 12, further comprising a transmitter which sends a location information request signal, relating to a specific area, to a transport protocol expert group (TPEG) service provider, wherein the controller controls the transmitter if the user requests to update the second map data of the specific area.

19. A computer-readable storage medium having embodied thereon a computer program for executing a method of updating map data, the method comprising:

receiving first location information and first map data from at least one of a broadcasting network, the Internet, and a transmission medium;

determining if the second map data stored in a device has changed by checking whether the first location information corresponds to second location information searched from the second map data; and updating the second map data based on the first map data or displaying the first map data, if the second map data has changed.

* * * * *